United States Patent [19]
Fukasawa et al.

[11] Patent Number: 4,577,106
[45] Date of Patent: Mar. 18, 1986

[54] SPECTROPHOTOMETER

[75] Inventors: Yoshiro Fukasawa; Tomoyuki Fukazawa; Michihiro Kawamura, all of Tokyo, Japan

[73] Assignee: Japan Spectroscopic Co., Ltd., Hachioji, Japan

[21] Appl. No.: 531,471

[22] Filed: Sep. 12, 1983

[51] Int. Cl.⁴ ............................................. G01N 21/61
[52] U.S. Cl. ..................................... 250/347; 250/343; 356/323
[58] Field of Search .............. 250/353, 351, 347, 343; 329/112; 364/484, 576; 356/323, 325

[56] References Cited

U.S. PATENT DOCUMENTS 2,679,010  5/1954  Lüft ...................................... 250/347

FOREIGN PATENT DOCUMENTS 0126581  10/1979  Japan ................................... 356/325

OTHER PUBLICATIONS

K. Leutwein, "A Simple Double Beam Accessory for Absorption Spectroscopy", *Applied Optics*, vol. 10, No. 1 (Jan. 1971) pp. 46–50.

Primary Examiner—Alfred E. Smith
Assistant Examiner—Constantine Hannaher
Attorney, Agent, or Firm—Wenderoth, Lind & Ponack

[57] ABSTRACT

In a double-beam spectrophotometer intended for spectral analysis in the infrared region, inputs to a light detector are switched to dark, reference light, sample light, and reference light in this order, and those components in an output signal of the detector which have a fundamental frequency corresponding to one cycle of the switching and a frequency twice the fundamental frequency undergo arithmetic operation to determine the ratio of the sample to reference light intensity, which is representative of the transmittance of the sample.

9 Claims, 5 Drawing Figures

SPECTROPHOTOMETER

BACKGROUND OF THE INVENTION

This invention relates to double-beam spectrophotometers, and more particularly, to spectrophotometers capable of spectral analysis in the infrared region using a thermal infrared detector such as a vacuum thermocouple detector.

As is well known in the art, the double beam spectrophotometers measures the transmittance of a sample by allowing light to alternately enter the sample and a reference or standard material (or an empty cell), measuring the intensity of a sample beam that has passed the sample and a reference or standard beam that has passed the reference or standard material, and comparing the sample beam intensity with the reference beam intensity, with the resultant ratio giving the transmittance of the sample. The signal processing method in such double beam spectrophotometers, that is, the method of automatically outputting the transmittance of the sample is generally classified into the optical null balance system widely used in conventional infrared spectrophotometers, the electrical direct ratio system, and the automatic gain control system, of which the latter two were recently developed.

The optical null system measures the transmission of a sample by alternately switching a sample beam and a reference beam attenuated by a mechanical beam attenuator, taking out an AC signal having an amplitude proportional to the difference ($I_0-I$) between the reference beam intensity $I_0$ and the sample beam intensity I, using this signal as an error signal in a closed loop, thereby automatically adjusting the mechanical attenuator associated with the reference beam such that the value of the difference ($I_0-I$) may always become zero. When the attenuator is adjusted in this way, the magnitude of beam attenuation itself, that is, the distance of movement in the attenuator is proportional to the transmittance so that changes in the transmittance of a sample can be recorded by recording the movement of the attenuator.

The above-mentioned optical null system is best with respect to percent utilization of signals and stability of measurement, but has several drawbacks described below. First of all, since the accuracy of transmittance largely depends on the mechanical accuracy of the attenuator itself as well as the associated drive system, the spectrophotometer is difficult to exhibit highly accurate and stable performance. In connection with this, due to fluctuations in rotation of a driving servo motor for moving a wedge-shaped stop commonly used in the attenuator, error in linearity of a potentiometer for detecting the position of the wedge-shaped stop, and other factors, the distance of movement of the stop is not always proportional to the magnitude of attenuation, often resulting in low accuracy of transmittance measurement. Further, the inclusion of the optical system in the servo loop results in a complicated and expensive apparatus which handles signals in a complicated way and has poor response. In the case of a sample having high absorbance, the sample beam intensity approximates to zero, and accordingly, the reference beam intensity is also attenuated to a level near zero, resulting in reduced loop gain and reduced reliability. In addition, the attenuator itself is reduced in accuracy when the magnitude of attenuation is very high, that is, when the sample has very high absorbance. These undesirably causes a substantial reduction in accuracy of measurement of a high absorbance sample. When the sample beam intensity is zero, the reference beam intensity also becomes zero so that the loop gain is zero, rendering the apparatus inoperative. It is, also a serious drawback that calibration, adjustment, and inspection of the apparatus cannot be carried out under the standard condition having the sample beam intensity set to zero.

The automatic gain control system which does not use a beam attenuator is a system in which time division is made by beam path switching means such as a sector mirror to allocate fractions to sample and reference beams and dark state when both sample and reference beams are interrupted, and the gain of signal processing means, for example, the gain of a detector or an amplifier is automatically controlled such that the reference beam intensity may always be at a constant level. In this system, an output of the amplifier corresponding to a sample beam directly corresponds to the ratio of sample beam intensity to reference beam intensity, that is, the transmittance of the sample. The transmittance is then directly available simply by sample holding an output of the amplifier corresponding to a sample beam. This system uses a gain controllable detector, for example, photomultiplier as the detector. When the detector gain is controlled in a feedback manner, all electric signal systems are contained in this loop so that the linearity and stability of detector and amplifier have no influence on measurement, insuring high accuracy in measurement. Further, because of the absence of a beam attenuator and a mechanical servo system and the possibility of setting absolute zero, this system has eliminated most of the drawbacks of the optical null sytem. However, infrared spectrophotometers carring out spectral analysis in the infrared region must use thermal detectors such as thermocouples. The thermal detectors are difficult to control their sensitivity and thus incompatible with the automatic gain control system. A spectrophotometer may be constructed using a thermal detector such that the thermal detector is connected to control the gain of an amplifier. However, since the thermal detector has a considerably slower speed of response and a considerably larger time constant than a photomultiplier detector used in visible-to-ultraviolet spectrophotometers, and the output waveform of the thermal detector does not correspond to the waveform representative of changes of the beam which has passed the beam path switching means, it is difficult to devise a practical automatic gain control system using a thermal detector.

The electrical direct ratio system does not use a beam attenuator and is a system in which an output signal of a light detector containing in admixture components corresponding to the intensities of sample and reference beams is amplified by a common amplifier before the individual components are electrically separated and the ratio of the individual components is electrically determined. This system is generally subdivided into two systems, frequency component detection system and phase discrimination system, depending on how to separate and take out components representative of sample and reference beam intensities from the amplifier output. In either case, separation of signal components can be carried out using thermal detectors such as thermocouples. Consequently, this system is adaptable to infrared spectrophotometers.

Among prior art spectrophotometers of the electrical direct ratio system, specifically the frequency component detection system is one disclosed in Japanese Patent Application Kokai No. SHO 52-10790 (published on Jan. 27, 1977). This spectrophotometer uses as beam path switching means for interrupting and switching beam paths for sample and reference beams, a sector mirror capable of alternately discontinuing the sample and reference beams at a given frequency f and a chopper capable of discontinuing the sample and reference beams at a frequency 2f twice the frequency f of the sector mirror. Since a component having frequency f in an output signal of the detector corresponds to the difference $(I_0 - I)$ between the reference beam intensity $I_0$ and the sample beam intensity I, and a component having frequency 2f corresponds to the sum $(I_0 + I)$ of the reference beam intensity $I_0$ and the sample beam intensity I, an output proportional to $I_0$ is obtained by adding the components having frequencies f and 2f and another output proportional to I is obtained by subtracting the one component from the other component. The value of $I/I_0$ is readily obtained through arithmetic operation on the ratio of these outputs. In this process, even when a sample beam is shut off or becomes zero, neither of the signals representative of the components having frequencies f and 2f become zero in the signal processing route. The apparatus is thus difficult to carry out calibration, adjustment or inspection under the standard condition having the sample beam intensity reduced to absolute zero. A serious problem arises that calibration and inspection of the apparatus cannot be carried out readily and accurately.

Among prior art spectrophotometers of the electrical direct ratio system, specifically the phase discrimination system, is one disclosed in Japanese Patent Application Kokai No. SHO 57-52832 (published on Mar. 29, 1982). This spectrophotometer is adapted to take out sample and reference beams at a phase difference of 90 degrees by means of a sector mirror. The detector thus produces an output signal in which a component representative of the sample beam intensity and a component representative of the reference beam intensity are mixed with a phase difference of 90 degrees, the output is synchronously rectified to provide a DC signal corresponding to the sample beam intensity and another DC signal corresponding to the reference beam intensity, and then the ratio of these signals is determined by arithmetic operation. Nevertheless, as wavelength scanning is generally carried out in spectral analysis, an output waveform of the detector in one cycle sometimes loses its symmetry in a wavelength region where the sample shows high absorbance. In addition, absorption by atmospheric water vapor and carbon dioxide has probably an influence on both the reference and sample beams, distorting the output waveform of the detector in one cycle. In the case of the phase discrimination system, such a distortion of the output waveform largely affects the phase, eventually resulting in a significant error in measurement. This problem will be further explained below. For high absorbance samples, absorbance varies very rapidly during wavelength scanning, resulting in a graded sample beam intensity in one cycle. Since a detector, particularly a thermal infrared detector such as a thermocouple has a large time constant, its output signal appears to have the effect of integrating the intensity waveform of incident light. If the sample beam intensity in one cycle has a gradient as mentioned above, the output waveform is offcentered from the input waveform of the sample beam intensity so that the phase difference between the sample and reference beam intensity components in the output is shifted from 90 degrees, resulting in an error. Also, absorption by atmospheric water vapor and carbon dioxide has an influence on the intensity waveform of incident light to the detector to distort an output signal of the detector to give rise to a similar phase shift, resulting in an error in measurement.

In the case of the phase discrimination system spectrophotometer, if dust deposits on slits in the paths for reference and sample beams and any obstructions in proximity to the beam paths partially intercept beams or mechanical positioning of slits is inaccurate, then the rise or fall of a waveform representative of the intensity of an incident beam to the detector is shifted from the originally set phase, and thus the corresponding output waveform of the detector is deviated, also resulting in an error in measurement. In principle, the phase discrimination system has the advantage that when a sample beam is zero, the DC signal which is separated by synchronous rectification as corresponding to the sample beam intensity essentially becomes zero so that calibration and inspection can be carried out under the standard condition of absolute zero. However, if the phase is shifted for any one of the above described reasons, the DC signal corresponding to the sample beam intensity is somewhat deviated from zero, reducing the accuracy in calibration and inspection.

As described above, the signal processing systems of the prior art spectrophotometers have their own advantages and disadvantages and are unsatisfactory particularly for spectral analysis in the infrared region.

It is, therefore, an object of the present invention to provide a spectrophotometer which has eliminated the disadvantages of the various prior art systems, and is particularly suitable for spectral analysis in the infrared region at a high accuracy with minimal error while calibration and inspection can be carried out in the standard condition of absolute zero.

Making extensive investigations to improve the electrical direct ratio system, specifically the frequency component detection system such that the standard condition of absolute zero can be used for calibration and inspection, the inventors have found that the standard condition of absolute zero can be used for calibration and inspection by using a specific order and combination of sample beam, reference beam, and dark state rather than those used in the prior art system as described in Japanese Patent Application Kokai No. SHO 52-10790, and by modifying the frequency component detection system to meet therewith.

SUMMARY OF THE INVENTION

According to the present invention, there is provided a double-beam spectrophotometer comprising means for emitting light through sample and reference cells to form sample and reference beams, respectively; beam path switching means located in the beam paths for cyclically interrupting and switching the sample and reference beams; a light detector for detecting a given spectrum of the beam which has passed said beam path switching means, to thereby produce an output signal; and signal processing means for processing output signals of said light detector to determine the ratio of intensity of the sample to reference beam; the improvement wherein said beam path switching means is switched in its one cycle among four states:
- a dark state interrupting both the sample and reference beams from passing,
- a first reference beam selecting state allowing only the reference beam to pass,
- a sample beam selecting state allowing only the sample beam to pass, and
- a second reference beam selecting state allowing only the reference beam to pass, in this order, and
said signal processing means includes
- a signal component separating circuit for separating from each output signal of said light detector a component having a fundamental frequency corresponding to one cycle of said beam path switching means and a component having a double frequency which is twice said fundamental frequency, and
- an arithmetic circuit for carrying out arithmetic operations on those signals output by said signal component separating circuit which correspond to the fundamental frequency and double frequency components.

BRIEF DESCRIPTION OF THE DRAWINGS

The above and other objects, features, and advantages of the present invention will be more fully understood by reading the following detailed description taken in conjunction with the accompanying drawings, in which.

DESCRIPTION OF THE PREFERRED EMBODIMENTS

Figure 1:
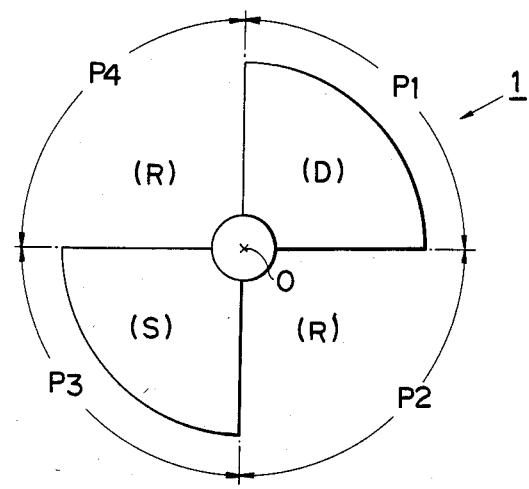
FIG. 1 is a schematic view of a sector mirror used as beam path switching means in the spectrophotometer according to the present invention.
Figure 2:
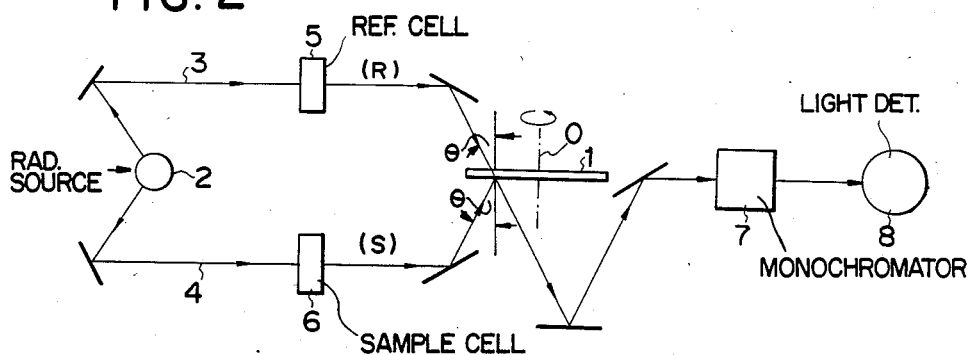
FIG. 2 is a schematic illustration of one optical system of the spectrophotometer according to the present invention using the sector mirror shown in FIG. 1.

In FIG. 1, a sector mirror 1 generally designated at 1 is illustrated as one example of beam path switching means used in the spectrophotometer of the present invention. FIG. 2 illustrates one examplary optical system of the spectrophotometer using the sector mirror 1 shown in FIG. 1.

Referring to FIG. 2, a radiation source 2 emits light along reference and sample beam paths 3 and 4 to pass through a reference cell 5 which may be either a cell filled with a standard material or an empty cell and a sample cell 6 filled with a sample. The light that the reference cell 5 has transmitted forms a reference beam and the light that the sample cell 6 has transmitted forms a sample beam. The reference and sample beams are then incident on the sector mirror 1 functioning as the beam path switching means where they are cyclically interrupted and switched. The selected one of the reference and sample beams then enters a monochromator 7 where it is spectrally isolated into monochromatic light which in turn, enters a light detector 8, more particularly, a thermal infrared detector such as a thermocouple.

The sector mirror 1 is coupled to drive means (not shown), for example, a synchronous motor, so as to rotate about its central axis of rotation O extending perpendicular to the plane of the mirror 1. The sector mirror 1 is located to transverse the crossing of the reference and sample beams such that the reference and sample beams are incident on it at a point radially spaced from its axis of rotation O at an equal incident angle $\theta$ of more than 0 degrees, but from its opposite sides as shown in FIG. 2. The sector mirror 1 is sectioned into four quadrants P1, P2, P3, and P4 or arcs of 90 degrees with respect to its axis of rotation O as shown in FIG. 1. The first quadrant P1 is a region which provides a dark state interrupting both the reference and sample beams, and in the illustrated embodiment, is formed as a non-reflective wall capable of preventing transmittance of the reference beam and reflection of the sample beam. The second quadrant P2 is a region which provides a first reference beam selecting state allowing only the reference beam to pass, and in the illustrated embodiment, is formed as a cut-out or space which transmits the reference beam, but does not reflect the sample beam. The third quadrant P3 is a region which provides a sample beam selecting state allowing only the sample beam to pass, and in the illustrated embodiment, is formed as a mirror region which reflects the sample beam, but does not transmit the reference beam. Finally, the fourth quadrant P4 is a region which provides a second reference beam selecting state allowing only the reference beam to pass again, and in the illustrated embodiment, is formed as a cut-out or space as is the second quadrant P2.

Figure 3:
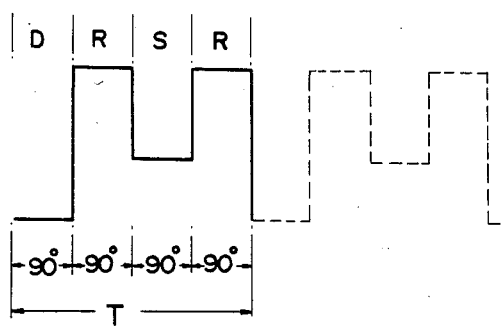
FIG. 3 is a waveform chart showing the sequence of beam path switching and interruption in the optical system shown in FIG. 2.

Upon rotation of the sector mirror 1, the light detector 8 alternately receives a reference beam R and a sample beam S through the monochromator 7 at time intervals shown in FIG. 3. More specifically, assuming that the dark state (D) starts at 0°, the drak state (D) continues for a quarter or 90° revolution. The sector mirror is then switched to the first reference beam selecting state where the reference beam R continues to enter the detector 8 for a second quarter or 90° of revolution; thereafter to the sample beam selecting state where the sample beam S continues to enter the detector 8 for a third quarter or 90° of revolution; and finally to the second reference beam selecting state where the reference beam R continues to enter the detector 8 again for a fourth quarter or 90° of revolution. In this way, four states of dark D, reference beam R, sample beam S, and reference beam R are repeated as a cycle having a time T. It would be readily understood that if the reference beam path 3 and the sample beam path 4 are exchanged with each other in FIG. 2, then the sector mirror 1 of FIG. 1 may be modified such that the reference beam selecting quadrants P2 and P4 are mirrors and the sample beam selecting quadrant P3 is a cut-out. In this case, each cycle consists of four states D, R, S, and R at the same time intervals as shown in FIG. 3.

Figure 4:
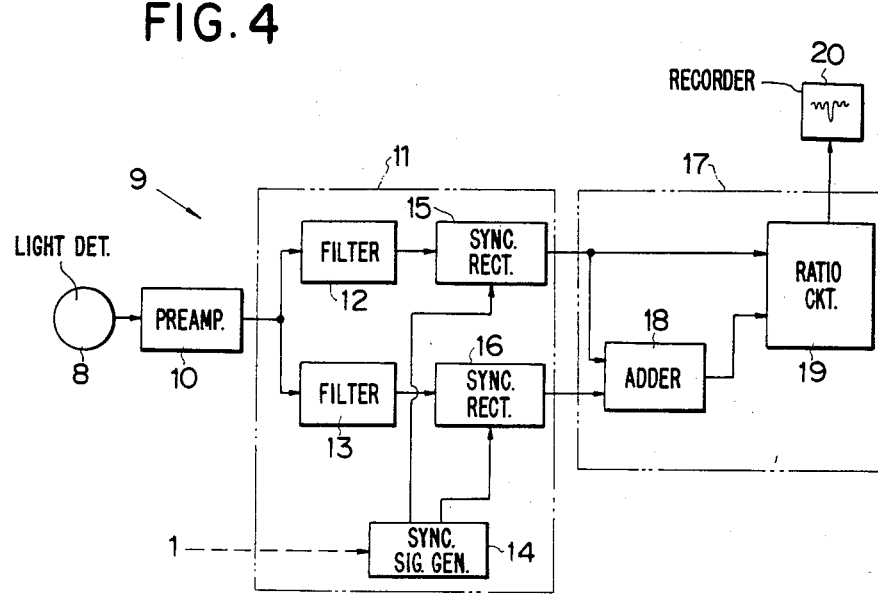
FIG. 4 is a block diagram showing one example of the signal processing means of the spectrophotometer according to the present invention.

FIG. 4 is a block diagram showing one embodiment of electrical signal processing means of the spectrophotometer according to the present invention which is electrically connected to the detector 8 in FIG. 2.

The signal processing means 9 comprises a signal component separating circuit and an arithmetic circuit generally designated at 11 and 17, respectively, in FIG. 4. The signal component separating circuit 11 receives a signal from the detector 8 in the form of a thermocouple through a pre-amplifier 10. This signal component separating circuit 11 serves to separately take out of the input signal a component having a fundamental frequency corresponding to one cycle of the abovementioned beam path switching means, that is, a component having a fundamental frequency f=1/T where one cycle consisting of the four states switched by the sector mirror 1 continues for a period of T second (to be referred to as f component, hereinafter), and a component having a double frequency 2f which is twice the fundamental frequency f (to be referred to as 2f component, hereinafter). More specifically, the signal component separating circuit 11 consists of a first filter 12 allowing the f component to pass, a second filter 13 allowing the 2f component to pass, a sync signal generator 14 which coordinates with the sector mirror 1 to generate sync signals, and f- and 2f-component synchronous rectifier circuits 15 and 16 for synchrously rectifying signals from the first and second filters 12 and 13 in synchronism with the sync signals to thereby produce DC signals corresponding to f- and 2f-components, respectively. The f- and 2f-component output signals taken out of the signal component separating circuit 11, that is, output signals of the f- and 2f-component synchronous rectifier circuits 15 and 16 are supplied to the arithmetic circuit 17 for arithmetic operation. More specifically, the arithmetic circuit 17 consists of an adder circuit 18 for adding the f- and 2f-component signals, and a ratio circuit 18 for determining the ratio of an output signal of the adder circuit 17 to the f-component signal.

The operation of the above-mentioned signal processing means 9 will be further described in conjunction with the operation of the sector mirror 1.

Figure 5:
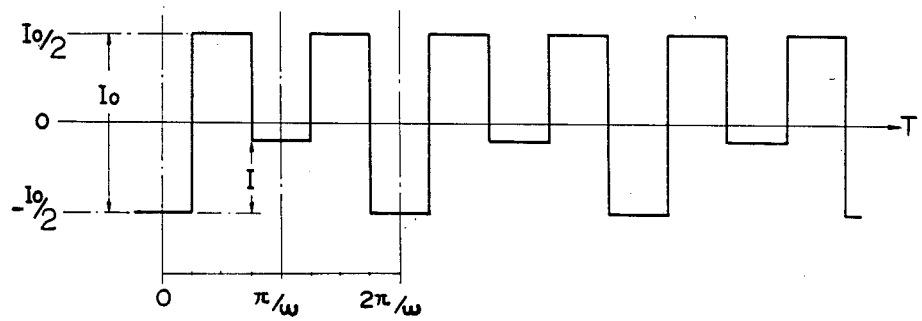
FIG. 5 is a diagram showing a waveform used in the Fourier expansion of an output waveform of the preamplifier in the circuit of FIG. 4.

The pre-amplifier 10 develops a signal whose waveform f(t) is diagramatically shown in FIG. 5. Of course, the actual waveform is more dull than that shown in FIG. 5 due to the time constant of the detector or the like. In FIG. 5, $I_0$ represents the intensity of a reference beam, I represents the intensity of a sample beam, and $\omega$ represents the angular velocity of the sector mirror.

The Fourier expansion of the waveform f(t) shown in FIG. 5 is carried out to determine a fundamental wave A(1) and a second harmonic wave A(2) under the assumption that a portion (0, $2\pi/\omega$) is cyclically connected. The fundamental wave A(1) or component A(1) having the fundamental frequency f is given by:

$$A(1) = \sqrt{2}\, I/\pi \tag{1}$$

The second harmonic wave A(2) or component having the double frequency 2f is given by:

$$A(2) = (2I_0 - I)/\pi \tag{2}$$

It is apparent from equation (1) that the component having fundamental frequency f (or output of the f-component synchronous rectifier circuit 15) is proportional to the sample beam intensity I. It is also apparent from equation (2) that the component having double frequency 2f (or output of the 2f-component synchronous rectifier circuit 16) is proportional to the double of the reference beam intensity $I_0$ minus the sample beam intensity I. Then, the adder circuit 18 produces a signal proportional to the reference beam intensity $I_0$ by adding the output of the f-component synchronous rectifier circuit 15 to the output of the 2f-component synchronous rectifier circuit 16. It is a matter of course that in actual operation, different coefficients in equations (1) and (2) are equalized by an intermediate gain control. For example, the component A(1) having fundamental frequency f is multiplied by $1/\sqrt{2}$ before it is added to the component A(2) having double frequency 2f as shown by the following equation:

$$A(1) \times 1/\sqrt{2} + A(2) = 2I_0/\pi \tag{3}$$

This means that the adder circuit 18 produces a signal representative of $I_0$ multiplied by a constant $2/\pi$, that is, a signal proportional to $I_0$.

A signal which is output by the adder circuit 18 and proportional to the reference beam intensity $I_0$ and another signal which is output by the f-component synchronous rectifier circuit 15 and proportional to the sample beam intensity I are fed to the ratio circuit 19, which produces a signal corresponding to the ratio $I/I_0$ of the sample beam intensity I to the reference beam intensity $I_0$. That is, the ratio circuit 19 develops an output corresponding to the transmittance or reciprocal of absorbance of a sample and this output is recorded by a recorder 20. For example, if an output of the adder circuit 18 as represented by equation (3) and an output of the f-component synchronous rectifier circuit 15 as represented by equation (1) are directly fed to the ratio circuit 19 where the ratio of them is determined, the ratio circuit 19 produces an output of $\sqrt{2}/2 \times I/I_0$, which value corresponds to the transmittance of the sample.

The component having fundamental frequency f is a function of the sample beam intensity I and is independent of the reference beam intensity $I_0$ as seen from equation (1). The component A(1) having fundamental frequency f becomes zero when the sample beam intensity I becomes zero. Therefore, calibration and inspection of the apparatus can be carried out under the standard condition that the sample beam path is blocked to provide a sample beam intensity I of abosolute zero. In this respect, the present invention is distinguishable from the invention of Japanese Patent Application Kokai No. SHO 52-10790, one of prior art apparatus of frequency component detection system. As pointed out earlier, in the system disclosed therein, the component having fundamental frequency f does not become zero even when the sample beam intensity is zero. It is thus difficult to carry out calibration and inspection under the standard condition having the sample beam intensity reduced to absolute zero. Calibration and inspection operations become very troublesome and inaccurate. On the contrary, pursuant to the present invention, gain control and inspection of the respective circuits in the apparatus can be carried out under the standard condition having the sample beam intensity reduced to absolute zero. Calibration and inspection can be carried out more accurately with ease of operation.

As understood from the foregoing, the spectrophotometer of the present invention uses as its signal processing system the frequency component detection system, one of the electrical direct ratio systems, but is advantageous over prior art apparatus of the same system in that calibration, adjustment and inspection of the circuits of the apparatus can be carried out under the standard condition having the sample beam intensity reduced to absolute zero and thus in an easier and more accurate manner. Although the prior art frequency component detection system requires two elements, a chopper and a sector mirror as the beam path switching means, the spectrophotometer of the present invention only requires a sector mirror, resulting in additional benefits that the optical system and the associated drive system become more simple in construction and less costly. When compared with the phase detection system, the spectrophotometer of the present invention has the advantage that when absorbance is high or distorted waveforms are detectable under the influence of atmospheric water vapor and carbon dioxide, such distortion of waveform has a significantly less influence on the frequency component than on the phase and there is little likelihood that such distortion might result in an increased error. Further, inaccurate positioning of slits in beam paths and the presence of dust and nearby obstructions have significantly less influence as compared with the phase detection system. These lead to the benefit of retaining high accuracy of measurement. When compared with the optical null system carrying out control through a mechanical light quantity regulation by a beam attenuator, the spectrophotometer of the present invention which does not need such an attenuator has eliminated the disadvantage that the overall accuracy of the apparatus is limited by the mechanical accuracy of the attenuator and its drive system, insuring high accuracy, simple structure and low cost of the apparatus. Measurement accuracy is kept high even at a high absorbance.

The spectrophotometer of the present invention is superior to the above-described automatic gain control system in that the former can use a thermal infrared detector such as a thermocouple and thus be advantageously adapted to measurement in the infrared region although a photomultiplier or the like may, of course, be used as the detector such that the spectrophotometer may be adapted to measurement in the visible and ultraviolet region.

What is claimed is:

1. In a double-beam spectrophotometer comprising
means for emitting light through sample and reference cells to form sample and reference beams, respectively,
beam path switching means located in the beam paths for cyclically interrupting and switching the sample and reference beams,
a light detector for detecting a given spectrum of the beam which has passed said beam path switching means, to thereby produce an output signal, and
signal processing means for processing output signals of said light detector to determine the ratio of intensity of the sample to reference beam,
the improvement wherein
said beam path switching means is switched in its one cycle among four states:
a dark state interrupting both the sample and reference beams from passing,
a first reference beam selecting state allowing only the reference beam to pass,
a sample beam selecting state allowing only the sample beam to pass, and
a second reference beam selecting state allowing only the reference beam to pass,
in this order, and
said signal processing means includes
a signal component separating circuit for separating from each output signal of said light detector a component having a fundamental frequency corresponding to one cycle of said beam path switching means and a component having a double frequency which is twice said fundamental frequency, and
an arithmetic circuit for carrying out arithmetic operations on those signals output by said signal component separating circuit which correspond to the fundamental frequency and double frequency components.

2. The spectrophotometer according to claim 1 wherein said light detector comprises a thermal infrared detector.

3. The spectrophotometer according to claim 2 wherein said thermal infrared detector comprises a thermocouple.

4. The spectrophotometer according to claim 1 wherein said arithmetic circuit includes
an adder circuit for adding those signals of said signal component separating circuit which correspond to the fundamental frequency and double frequency components to give the sum of said signals, and
a ratio circuit for determining the ratio of said sum to said signal corresponding to the fundamental frequency component.

5. The spectrophotometer according to claim 1 wherein said beam path switching means comprises a sector mirror having a central axis of rotation and operatively coupled to drive means, and
said sector mirror is sectioned about its axis of rotation into four quadrants corresponding to said dark state, first reference beam selecting state, sample beam selecting state, and second reference beam selecting state, in this order.

6. The spectrophotometer according to claim 5 wherein said sector mirror is located such that said reference and sample beams are incident on said sector mirror at a point radially spaced from its axis of rotation and at an equal incident angle of less than 90°, but from opposite sides of said sector mirror, and said sector mirror is sectioned about its axis of rotation into four quadrants:
a non-reflective wall quadrant preventing passage and reflection of both the reference and sample beams,
a first transmitting quadrant allowing the reference beam to pass,
a mirror quadrant reflecting the sample beam, and
a second transmitting quadrant allowing the reference beam to pass,
in this order.

7. The spectrophotometer according to claim 5 wherein said sector mirror is located such that said reference and sample beams are incident on said sector mirror at a point radially spaced from its axis of rotation and at an equal incident angle of less than 90°, but from opposite sides of said sector mirror, and said sector mirror is sectioned about its axis of rotation into four quadrants:
a non-reflective wall quadrant preventing passage and reflection of both the reference and sample beams,
a first mirror quadrant reflecting the reference beam,
a transmitting quadrant allowing the sample beam to pass, and
a second mirror quadrant reflecting the reference beam,
in this order.

8. The spectrophotometer according to claim 1 wherein said signal component separating circuit includes
- a first filter essentially allowing only the fundamental frequency component to pass, and
- a second filter essentially allowing only the double frequency component to pass.

9. In a double-beam spectrophotometer comprising
means for emitting light through sample and reference cells to form sample and reference beams, respectively,
beam path switching means located in the beam paths for cyclically interrupting and switching the sample and reference beams,
a light detector for detecting a given spectrum of the beam which has passed said beam path switching means, to thereby produce an output signal, and
signal processing means for processing output signals of said light detector to determine the ratio $I/I_0$ of the intesity $I$ of a sample beam to the intensity $I_0$ of a reference beam,
the improvement wherein
said beam path switching means is switched in its one cycle among four states:
- a dark state interrupting both the sample and reference beams from passing,
- a first reference beam selecting state allowing only the reference beam to pass,
- a sample beam selecting state allowing only the sample beam to pass, and
- a second reference beam selecting state allowing only the reference beam to pass, in this order, and
said signal processing means includes
a signal component separating circuit for separating from each output signal of said light detector a component $A(1)$ having a fundamental frequency corresponding to the cycle of said beam path switching means and a component $A(2)$ having a double frequency which is twice said fundamental frequency, said fundamental frequency component $A(1)$ and double frequency component $A(2)$ being taken out in the form of $\sqrt{2}I/\pi$ and $(2I_0-I)/\pi$, respectively, and
an arithmetic circuit for carrying out arithmetic operations on those signals output by said signal component separating circuit which correspond to the fundamental frequency and double frequency components, said arithmetic circuit including
an adder circuit for adding those signals of said signal component separating circuit which correspond to the fundamental frequency and double frequency components $A(1)$ and $A(2)$, to give the sum of said signals such that $I$ is eliminated from said sum while carrying out an appropriate coefficient adjustment, and
a ratio circuit for determining the ratio of an output signal of said adder circuit which is proportional to $I_0$ to that signal of said signal component separating circuit which corresponds to the fundamental frequency component $A(1)$ and is proportional to $I$.

* * * * *